United States Patent Office 3,763,081
Patented Oct. 2, 1973

---

3,763,081
CURABLE ALIPHATICALLY UNSATURATED SILOXANE AND IMIDE BLENDS
Fred F. Holub and Abe Berger, Schenectady, N.Y., assignors to General Electric Company
No Drawing. Filed Jan. 17, 1972, Ser. No. 218,594
Int. Cl. C08g 51/04; C08k 1/02
U.S. Cl. 260—37 SB                                                                9 Claims

ABSTRACT OF THE DISCLOSURE

Resins are obtained from blends of aliphatically unsaturated siloxanes and imide containing compounds which have good resistance to mechanical deformation at elevated temperatures. These resins are particularly useful for making composite materials and molded articles.

---

This invention is concerned with improved polymeric compositions prepared from blends of aliphatically unsaturated siloxanes and imides. More particularly the invention relates to compositions of matter comprising an aliphatically unsaturated siloxane and member selected from the group consisting of a bisimide, and the reaction product of a diamine with a bisimide. The composition is cured by heating to a sufficient temperature or in the presence of a free radical catalyst.

The aliphatically unsaturated siloxane compounds used in the present invention may be represented by the general formula, (I)
$$CH_2=CH-\underset{\underset{R}{|}}{\overset{\overset{R}{|}}{Si}}-O-\left[\underset{\underset{R}{|}}{\overset{\overset{R}{|}}{Si}}-O\right]_n\underset{\underset{R}{|}}{\overset{\overset{R}{|}}{Si}}-CH=CH_2$$

wherein R is a monovalent hydrocarbon radical and $n$ is a whole number having a value of 0–150. Representative R groups in Formula I are lower alkyl radicals, phenyl radicals and aliphatically unsaturated radicals. Compounds of this type are well known and may be represented by the following formulae:

(II)
$$CH_2=CH-\underset{\underset{CH_3}{|}}{\overset{\overset{CH_3}{|}}{Si}}-O-\left[\underset{\underset{C_6H_5}{|}}{\overset{\overset{C_6H_5}{|}}{Si}}-O\right]_n\underset{\underset{CH_3}{|}}{\overset{\overset{CH_3}{|}}{Si}}-CH=CH_2$$

(III)
$$CH_2=CH_2-\underset{\underset{CH_3}{|}}{\overset{\overset{CH_3}{|}}{Si}}-O-\left[\underset{\underset{\underset{CH_2}{\parallel}}{\overset{\overset{CH_3}{|}}{Si}}}{\overset{CH}{}}-O\right]_n\underset{\underset{CH_3}{|}}{\overset{\overset{CH_3}{|}}{Si}}-CH=CH_2$$

(IV)
$$CH_2=CH-\underset{\underset{CH_3}{|}}{\overset{\overset{CH_3}{|}}{Si}}-O-\left[\underset{\underset{\underset{CN}{|}}{\overset{\overset{CH_3}{|}}{Si}}}{\overset{C_3H_5}{}}-O\right]_n\underset{\underset{CH_3}{|}}{\overset{\overset{CH_3}{|}}{Si}}-CH=CH_2$$

(V)
$$CH_2=CH-\underset{\underset{CH_3}{|}}{\overset{\overset{CH_3}{|}}{Si}}-O-\left[\underset{\underset{\underset{CH_2}{\parallel}}{\overset{\overset{CH_3}{|}}{Si}}}{\overset{CH}{}}-O\right]_m\left[\underset{\underset{CH_3}{|}}{\overset{\overset{CH_3}{|}}{Si}}-O\right]_n\underset{\underset{CH_3}{|}}{\overset{\overset{CH_3}{|}}{Si}}-CH=CH_2$$

and (VI)
$$CH_2=CH-\underset{\underset{CH_3}{|}}{\overset{\overset{CH_3}{|}}{Si}}-O-\left[\underset{\underset{C_6H_5}{|}}{\overset{\overset{CH_3}{|}}{Si}}-O\right]_n\underset{\underset{CH_3}{|}}{\overset{\overset{CH_3}{|}}{Si}}-CH=CH_2$$

wherein $m$ is a whole number having a value of 0–50 $n$ is defined as hereinabove. The preferred aliphatically unsaturated siloxanes are as follows:

(VII)
$$CH_2=CH-\underset{\underset{CH_3}{|}}{\overset{\overset{CH_3}{|}}{Si}}-O-\underset{\underset{CH_3}{|}}{\overset{\overset{CH_3}{|}}{Si}}-CH=CH_2$$

(VIII)
$$CH_2=CH-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_{20}-O-\underset{\underset{CH_3}{|}}{\overset{\overset{CH_3}{|}}{Si}}-CH=CH_2$$

(IX)
$$CH_2=CH-\underset{\underset{CH_3}{|}}{\overset{\overset{CH_3}{|}}{Si}}-\left[O-\underset{\underset{C_6H_5}{|}}{\overset{\overset{CH_3}{|}}{Si}}\right]_{10}-O-\underset{\underset{CH_3}{|}}{\overset{\overset{CH_3}{|}}{Si}}-CH=CH_2$$

(X)
$$CH_2=CH-\underset{\underset{CH_3}{|}}{\overset{\overset{CH_3}{|}}{Si}}-\left[O=\underset{\underset{CH=CH_2}{|}}{\overset{\overset{CH_3}{|}}{Si}}\right]_3-\left[O-\underset{\underset{CH_3}{|}}{\overset{\overset{CH_3}{|}}{Si}}\right]_{15}-O-\underset{\underset{CH_3}{|}}{\overset{\overset{CH_3}{|}}{Si}}-CH=CH_2$$

The imide portion of the blend is supplied by a bisimide, the reaction product of a diamine with an excess of bisimide or the reaction product of trimellitic anhydride with a diamine to form an amide-imide. The bisimide has the general formula, (XI)

$$R''\underset{\underset{O}{\parallel}}{\overset{\overset{O}{\parallel}}{\underset{C}{\overset{C}{\diagdown}}}}\diagup\!\!\!\underset{C}{\overset{C}{\diagdown}}\!\!\!\diagup N-Q-N\underset{\underset{O}{\parallel}}{\overset{\overset{O}{\parallel}}{\underset{C}{\overset{C}{\diagup}}}}\diagdown\!\!\!\underset{C}{\overset{C}{\diagup}}\!\!\!\diagdown R''$$

wherein R'' is a member selected from the class consisting of $$\underset{\underset{X}{|}}{\overset{\overset{X}{|}}{\underset{C}{\overset{C}{|}}}}-,\quad\underset{\underset{CH_2}{\diagdown\diagup}}{\overset{\overset{CH_2}{\diagup\diagdown}}{\underset{CH}{\overset{CH}{|}}\underset{HC}{\overset{HC}{|}}}}-,$$

and $$\underset{\underset{(CH_3)_m}{\diagdown\diagup}}{\overset{\overset{OH}{\diagup\diagdown}}{\underset{HC}{\overset{HC}{\underset{\parallel}{|}}}\underset{CH_2}{\overset{CH_2}{|}}\underset{HC}{\overset{HC}{|}}}}H$$

groupings, and halogenated derivatives, Q is a member selected from the group consisting of alkylene containing from 2–20 carbon atoms, cycloalkylene, alkylcycloalkylene, xylylene, phenylene, lower alkylphenylene, (biphenylene and diphenyl structures shown), and (diphenyl-Z- structure shown), wherein Z is a member selected from the group consisting of divalent aliphatic, cycloaliphatic or araliphatic (having 1–8 carbon atoms), $$-O-,\ -\overset{\overset{O}{\parallel}}{C}-,\ -S-,\ \text{and}\ -SO_2-$$

X is a member of the class consisting of hydrogen, halogen, and the methyl radical, and $m$ is 0 or 1.

The organic diamines useful in the present invention may be represented by the general formula, (XII)        $NH_2—Q'—NH_2$ wherein Q' is defined by the same radicals as Q set forth hereinabove. Typical of such diamines are the following:

m-phenylene diamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzene,
1,3-diamino-4-isopropylbenzene,
1,2-bis(3-aminopropoxy)ethane,
m-xylylenediamine,
p-xylylenediamine,
bis(4-aminocyclohexyl)methane,
decamethylenediamine,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine, and mixtures thereof. It should be noted that these diamines are given merely for the purpose of illustration and are not considered to be all inclusive. Other diamines not mentioned will readily be apparent to those skilled in the art.

Having described the bisimide and the diamine, the reaction product of the bisimide and the diamine can occur in various ratios from 1:1 to 2:1 respectively. An illustration wherein the ratio is 2:1 is represented by the general formula, (XIII) 

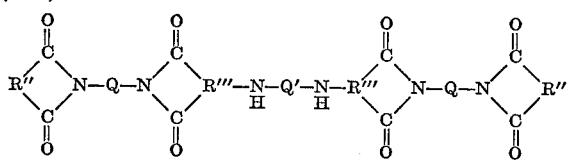

wherein R'', Q and Q' are as described hereinabove (the Q' radical derived from the diamine is frequently not the same as the Q derived from the bisimide) and R''' is the same as R'' with the exception that a primary amino group from the diamine has been reacted with the double bond of the imide group. Other polymeric forms which fall within the prescribed range of ratios are more complicated. A particular useful unsaturated amide imide is one prepared from 2.5 moles of bismaleimide with 1 mole of methylene dianiline.

As a further embodiment of our invention, the unsaturated siloxane may be blended with the reaction product of trimellitic anhydride with a diamine and maleic anhydride as illustrated by the following formula:

(XIV) 

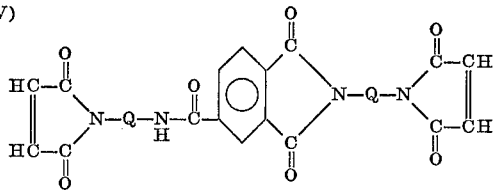

wherein Q is as defined hereinabove.

The ratio of the aliphatically unsaturated siloxane to the bisimide in the blend may vary over a wide range. Thus, 10–90 mole percent of the aliphatically unsaturated siloxane may be reacted with 10–90 mole percent of a bis- or poly-unsaturated imide in the presence of a peroxide catalyst.

To prepare the composition of the present invention, conventional techniques can be used to produce a blend of the aliphatically unsaturated siloxane and imide containing compounds and any other ingredients including copolymerizable compounds, fillers, pigments, etc. For example, the components can be admixed by hot milling on a mill or a mixer. If the free radical source is an organic peroxide, it can be milled at the same time with the other components.

The composition is then shaped by any conventional method to the desired form before curing. The shaped composition is cured by a free radical mechanism and any source of free radicals can be used including organic peroxides as well as actinic radiation. Curing can also be effected at elevated temperatures in an oxygen containing atmosphere.

Organic peroxides having a decomposition point in excess of about 100° C. are preferred in order to minimize loss of peroxide during the elevated milling temperatures used. The preferred peroxides are dicumyl peroxide and $\alpha,\alpha'$ - bis(t-butylperoxy)diisopropylbenzene. Other useful peroxides include benzoyl peroxide, dibenzoyl peroxide, di-t-butylperoxide, t-butylbenzoyl peroxide, cumene hydroperoxide, and lauroyl peroxide. Also effective are the azo compounds, such as azobis-isobutylronitrile. The amount of catalyst may vary widely. Generally the catalyst can be used in an amount of 0.01–5.0% by weight of the total polymer blend.

Fillers, pigments and dyes may be used in making the polymer blend of the present invention. The fillers may be in the form of particles or fibers. Typical fillers include ground ceramics, glass, silica, quartz, mica, treated clays, titanium dioxide, boron nitride, graphite, carbon black, glass fibers, asbestos fibers, and metal powders such as iron powder, copper powder or aluminum powder. The amount of filler used depends on the particular properties of the composition desired. Filler in amounts of up to about 300 percent by weight of the polymer composition may be used.

In the compounding of the present compositions, other modifying materials which do not have a detrimental effect on the properties of the cured composition, such as antioxidants, heat stabilizers, and lubricants may be included. The blending and heat curing of the composition can be varied widely. Thus, the curing temperatures may vary from about 125°–250° C. for a time of 1 minute to 2 hours or more. Molding pressures of 5 p.s.i. to 5000 p.s.i. or more may be used. Any conventional molding technique such as compression molding, extrusion, injection, etc., may be employed.

In order to reduce cost and to modify some of the properties of the cured polymer, such as hardness, stiffness, and ultraviolet resistance, various aliphatically unsaturated compounds containing up to 3 or more unsaturated groups per molecule such as chlorostyrene, methylmethacrylate, methyl acrylate, diallylphthalate, triallyl cyanurate, triallyl isocyanurate, maleimido-substituted polybenzylene, etc., may be substituted in an amount up to 80 weight percent for the aliphatically unsaturated siloxane.

In order that those skilled in the art may better understand how the present invention may be practiced, the following examples are given by way of illustration and not by way of limitation.

EXAMPLE I

One gram of tetramethyldivinylsiloxane fluid was mixed with 4 grams of a bismaleimide (prepared from maleic anhydride and p,p'-methylene dianiline hereinafter designated as "BMI") together with 0.1 gram of dicumyl peroxide. The mixture was stirred and heated at 140–180° C. for 10 minutes, resulting in a hard crosslinked solid siloxane-imide copolymer which did not soften even at 200° C.

EXAMPLE II

Following the procedure of Example I, a mixture was formed from 3.7 grams of an aliphatically unsaturated silicone fluid having the following composition:

| Substituent group: | Mole percent |
|---|---|
| Dimethylsiloxy | 98.4 |
| Dimethylvinylsiloxy | 0.94 |
| Methylvinylsiloxy | 0.50 |
| Trimethylsiloxy | 0.16 | and 6.3 grams of "BMI" together with 0.1 gram of dicumyl peroxide. The mixture was heated to a temperature of 140–170° C. for 20 minutes to form a yellow solid polymeric composition which did not soften at temperatures exceeding 200° C.

EXAMPLE III

Following the procedure of Example I, a mixture was formed from 1.4 grams of a fluid having the average structure formula as follows:

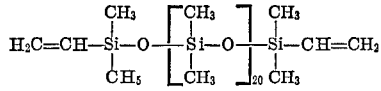

and 5.0 grams of "BMI." The mixture was heated to 140° C. and then gradually 220° C. to form a yellow resin upon cooling. This crosslinked resin was produced thermally in an oxygen containing atmosphere. The product was a thermoset material containing siloxane groups.

EXAMPLE IV

Following the procedure of Example II, 4.0 grams of an aliphatically unsaturated silicone fluid having the following composition:

| Substituent group: | Mole percent |
|---|---|
| Methylphenylsiloxy | 50.6 |
| Dimethylsiloxy | 48.4 |
| Vinyldimethylsiloxy | 0.5 |
| Trimethylsiloxy | 0.5 | is mixed with 6.0 grams of "BMI" together with 0.1 gram of dicumyl peroxide. The mixture is heated to a temperature of 140–180° C. for a sufficient time to form a thermosetting resin containing siloxane groups.

EXAMPLE V

Following the procedure of Example II and using 1.0 gram of the aliphatically unsaturated siloxane fluid of Example II, a mixture was formed with 3.3 grams of a bismaleimide prepared by reacting 5.0 moles of "BMI" with 2.0 moles of p,p'-methylene dianiline. The mixture was heated at a temperature of 140–230° C. for a sufficient time to form a hard thermosetting resin on cooling containing siloxane groups.

It will be appreciated that the invention is not limited to the specific details shown in the examples and illustrations and that various modifications may be made within the ordinary skill in the art without departing from the spirit and scope of the invention.

We claim:
1. A composition of matter comprising 10–90 mole percent of an aliphatically unsaturated siloxane of the formula:

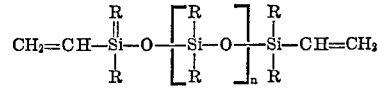

wherein R is a monovalent hydrocarbon radical and $n$ is a whole number having a value of 0–150 and 10–90 mole percent of a member selected from the group consisting of an aliphatically unsaturated bisimide having the general formula:

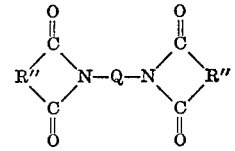

wherein R″ is a member selected from the class consisting of

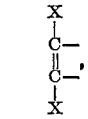

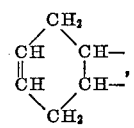

and

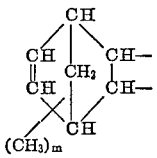

groupings, and halogenated derivatives, Q is a member selected from the group consisting of alkylene containing from 2–20 carbon atoms, cycloalkylene, alkylcycloakylene, xylylene, phenylene, lower alkylene,

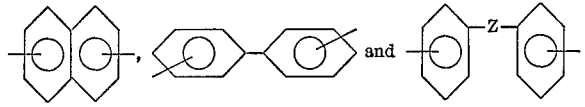

wherein Z is a member selected from the group consisting of divalent aliphatic, cycloaliphatic, or araliphatic (having 1–8 carbon atoms),

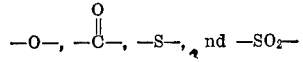

X is a member of the class consisting of hydrogen, halogen, and the methyl radical, and $m$ is 0 or 1 and the reaction product of a diamine with an excess of said aliphatically unsaturated bisimide.

2. The composition of claim 1, having incorporated therein a small amount of a free radical curing agent.
3. The heat cured product of claim 1.
4. The composition of claim 1, wherein said member is the reaction product of an organic diamine of the formula:

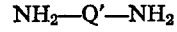

wherein Q' is defined by the symbol Q hereinabove, with an excess of the bisimide.

5. The composition of claim 1, which has been blended with up to 300% by weight of a filler selected from the group consisting of ground ceramics, glass, silica, quartz, mica, clays, titanium dioxide, boron nitride, graphite, carbon black, glass fibers, asbestos fibers, iron powder, copper powder, and aluminum powder.

6. The composition of claim 1, wherein said aliphatically unsaturated siloxane is a fluid having the average structural formula:

$$H_2C=CH-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{20}-\underset{\underset{CH_3}{|}}{\overset{\overset{CH_3}{|}}{Si}}-CH=CH_2$$

and said bisimide has the formula:

[structural formula of bisimide]

7. A method of making a polymeric resin comprising blending 10–90 mole percent of an aliphatically unsaturated siloxane of the formula:

$$CH_2=CH-\underset{\underset{R}{|}}{\overset{\overset{R}{|}}{Si}}-O-\left[\underset{\underset{R}{|}}{\overset{\overset{R}{|}}{Si}}-O\right]_n-\underset{\underset{R}{|}}{\overset{\overset{R}{|}}{Si}}-CH=CH_2$$

wherein R is a monovalent hydrocarbon radical and $n$ is a whole number having a value of 0–150, and a 10–90 mole percent of an aliphatically unsaturated bisimide having the general formula

[structural formula of bisimide with R″, N-Q-N, R″]

wherein R″ is a member selected from the class consisting of

[structural formulas]

groupings, and halogenated derivatives, Q is a member selected from the group consisting of alkylene containing from 2–20 carbon atoms, cycloalkylene, alkylcycloalkylene, xylylene, phenylene, lower alkylene,

[structural formulas] and wherein Z is a member selected from the group consisting of divalent aliphatic, cycloaliphatic, or araliphatic (having 1–8 carbon atoms), $$-O-, \; -\overset{\overset{O}{\|}}{C}-, \; -S-, \text{ and } -SO_2-$$

X is a member of the class consisting of hydrogen, halogen, and the methyl radical, and $m$ is 0 or 1 in the presence of a free radical curing agent and heat curing said mixture.

8. The method of claim 7, wherein said aliphatically unsaturated siloxane is a fluid having the average structural formula:

$$H_2C=CH-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{20}-\underset{\underset{CH_3}{|}}{\overset{\overset{CH_3}{|}}{Si}}-CH=CH_2$$

said bisimide is bismaleimide, the curing agent is an organic peroxide and the curing temperature is in the range of 125–250° C.

9. The composition of claim 1, wherein said member is an aliphatically unsaturated bisimide.

References Cited
UNITED STATES PATENTS

| | | | |
|---|---|---|---|
| 3,553,282 | 1/1971 | Holub | 260—46.5 E X |
| 3,558,741 | 1/1971 | Holub et al. | 260—46.5 E X |

LEWIS T. JACOBS, Primary Examiner

U.S. Cl. X.R.

260—46.5 UA